(12) United States Patent
Mizobata et al.

(10) Patent No.: US 6,473,140 B1
(45) Date of Patent: Oct. 29, 2002

(54) ACTIVE MATRIX LIQUID CRYSTAL DISPLAY

(75) Inventors: Eishi Mizobata; Naoyasu Ikeda; Yoshihiko Hirai, all of Tokyo (JP)

(73) Assignee: NEC Corporation (JP)

(*) Notice: Subject to any disclaimer, the term of this patent is extended or adjusted under 35 U.S.C. 154(b) by 0 days.

(21) Appl. No.: 09/518,987

(22) Filed: Mar. 3, 2000

Related U.S. Application Data

(62) Division of application No. 08/960,997, filed on Oct. 30, 1997, now Pat. No. 6,069,675, which is a continuation of application No. 08/531,379, filed on Sep. 21, 1995, now abandoned.

(30) Foreign Application Priority Data

Sep. 28, 1994 (JP) .............................. 6-233489
Aug. 9, 1995 (JP) .............................. 7-203149

(51) Int. Cl.[7] .......................................... G02F 1/1335
(52) U.S. Cl. ......................................... 349/12; 349/113
(58) Field of Search .............................. 349/12, 16, 51, 349/165, 186

(56) References Cited

U.S. PATENT DOCUMENTS 6,069,675 A * 5/2000 Mizobata et al. .............. 349/12
6,100,956 A * 8/2000 Oh-e et al. ................... 349/141

FOREIGN PATENT DOCUMENTS

| JP | 5-249426 | * | 9/1993 |
| JP | 40-6222351 | * | 8/1994 |
| JP | 10-115704 | * | 5/1998 |
| JP | 2000-131685 | * | 5/2000 |

* cited by examiner

Primary Examiner—Toan Ton
Assistant Examiner—Dung Nguyen
(74) Attorney, Agent, or Firm—Hayes Soloway P.C.

(57) ABSTRACT

In an LCD, there is used a GH-mode liquid crystal of which change in transmittivity due to variation in gap thickness is less than that of the conventional TN liquid crystal. A tablet facility is directly arranged or electrodes having the function of the tablet are formed over or below the liquid crystal. Thanks to the structure, this protection plate conventionally required to prevent the change in gap thickness resulting due to pressure of a pen input device applied to the LCD can be eliminated. Consequently, it is possible to reduce weight, volume, and parallax of the LCD. An active matrix LCD with integrated table-type input device is attainable in a simple configuration without increasing weight and volume thereof.

3 Claims, 6 Drawing Sheets

ACTIVE MATRIX LIQUID CRYSTAL DISPLAY

This application is a Div of Ser. No. 08/960,997 filed Oct. 20, 1997, U.S. Pat. No. 6,069,675 which is a continuation of Ser. No. 08/531,379 filed Sep. 21, 1995 now abandoned.

BACKGROUND OF THE INVENTION

The present invention relates to a liquid crystal display (LCD) and, in particular, to an active matrix LCD integrated with a pen input apparatus. Description of the Related Art FIG. 1 is a cross-sectional view briefly showing structure of an example of an active matrix LCD of a twisted nematic (TN) mode driven or addressed by thin-film transistors (TFTs). As can be seen from FIG. 1, the active matrix LCD of the prior art includes a substrate 10a with pixel electrodes 8 and a substrate 10b with a common electrode 6. Each glass substrate 10a, 10b has a thickness of about 0.6 millimeter (mm) to 1.1 mm.

Disposed on the glass substrate 10b is a common electrode layer 6. For a color panel, there is further arranged a color filters. On the other side, there are disposed on the glass of the substrate 10a a plurality of gate and drain bus lines in a matrix shape. In association with the gate and drain bus lines, thin-film transistors (TFTs) 9 are connected to pixel electrodes 8. Consequently, both heat resisting characteristic and flatness are required for the glass substrate employed as the substrate 10a for fabrication of these TFTs 9. The glass substrates 10a and 10b are separated from each other by spacers having a diameter of about several micrometers ($\mu$m). Sealed in the gap therebetween is liquid crystal to form a liquid crystal layer 7 so as to form a liquid crystal panel. On each of two outside surfaces, there are arranged polarizing plates 2. For an LCD of a transmission type, a back light layer 11 is provided as shown in FIG. 1. For an LCD of a reflective or reflection type, a polarizer plate of a reflection type is disposed on one of the outside surfaces in place of one of the transmission-type polarizing plates 2. Additionally, electrodes for pen input operation 4 are formed on the opposing glass substrate 10b. This allows use of data input facilities such as a screen input apparatus in which data is inputted to the liquid crystal display when a surface of the apparatus is depressed, for example, by a pen 1.

In addition to the liquid crystal display above, there exists an active matrix LCD of phase-change guest-host (PCGH) mode driven by thin-film transistors. Although the glass substrates of the LCD are the same as those of the TN-type LCD, the liquid crystal includes dichroic dye mixture; moreover, the polarizer plates are dispensed with. As a consequence, when the GH-mode LCD is produced as a reflection-type display, metallic electrodes of aluminum or the like are employed as the pixel electrodes to function also as reflection plates. An LCD having the configuration above has been described, for example, in pages 437 to 440 of the SID 92 Digest entitled "Bright Reflective Multicolor LCDs Addressed by a-Si TFTs" written by S. Mitsui, Y. Shimada, K. Yamamoto, T. Takamatsu, N. Kimura, S. Kozaki, S. Ogawa, H. Morimoto, M. Matsuura, M. Ishii, K. Awane, and T. Uchida.

There has been known an apparatus to input images in a computer in which an input device is integrated with a display including a screen such that when the screen is directly touched, for example, by a finger, the touched position is presented on the screen.

For example, as shown in FIG. 2, there exists an apparatus including a display 12 and a tablet 13 separated from the display 12, which are fixedly attached onto each other. In this constitution, for example, a liquid crystal display is adopted as the display 12 and a resistive-film-type tablet is used as the tablet in which, for example, small openings are disposed between two resistive films connected to a power source. When the resistive films are brought into contact with each other, an electric current resultantly flowing through the contract point is sensed so as to detect the position of the contact point. In this regard, a reference numeral 14 designates a pen for designating the indication point in FIG. 2. Subsequently, FIG. 3 shows a cross-sectional view of a display with integrated tablet constructed as shown in FIG. 2. The display of FIG. 3 includes a tablet 15, polarizer layers 16 and 17, glass substrates 18 and 19 keeping liquid crystal therebetween, twisted nematic (TN) liquid crystal 20, and a back light layer 21 as a light source.

Conventionally, according to an active matrix LCD in the field of the present invention, a glass substrate having a thickness of about 0.6 mm to about 1.1 mm is utilized for each of the substrates. In consideration of mechanical strength of the glass substrate, it is difficult to further reduce the thickness thereof. In the case where a screen input apparatus such as a pen input device is combined with the LCD of this kind, when a pen of the pen input device is brought into contract with a surface of the LCD to input data such as characters and letters, the thickness of the glass substrate, i.e., the distance between an end point of the pen placed on the surface and an image formed by the liquid crystal is observed as parallax, leading to difficulty in input operation.

On the other hand, the thickness of each film substrate of the LCD is set to about 0.1 mm to remove parallax, when other films are accumulated on the substrate on the pixel electrode side to construct switching elements, the substrate may be warped or cambered by stress of the accumulated thin films because of the reduced thickness of the substrate. In addition, there also exists a problem in which when handling the substrate, the substrate is bent and hence switching elements thus formed are damaged.

Generally, moreover, in a display using the TN liquid crystal, when the gap thickness of liquid crystal is changed, the angle of twist of the liquid crystal is also varied in the pertinent portion, resulting in considerable alteration in transmittivity. Consequently, in the case where a display with integrated tablet is formed using the liquid crystal of TN mode as shown in FIG. 2, when the operator pushes a pen 14 against the tablet 13 to input data in the display, the gap thickness of liquid crystal is altered at the contact point of the pen 14 and in the periphery thereof. Consequently, the value of transmittivity at the position varies from the inherent value thereof in the display operation. This accordingly leads to the problem that quality of the image displayed therein is deteriorated when compared with that of the image in other areas of the screen.

To solve this problem, there has been proposed a method in which, as shown in FIG. 4, a transparent protective layer 23 formed of glass, plastic, or the like is inserted between the tablet 13 and the LCD 12 to prevent pressure of the pen 14 from exerting influence upon the LCD 12. However, when this method is employed, in order to keep the gap thickness of the LCD 12 unchanged, it is necessary to guarantee that the protective layer 23 is not deformed by pressure. For this purpose, a considerably thick and strong protective layer is required to be provided between the tablet 13 and the LCD 12. This inevitably results in of increase in weight and thickness when producing the display with integrated tablet. Additionally, since the end point of the pen 14 is separated from the liquid crystal by several millimeters or more, there also occurs a problem of parallax, namely, the image is displayed at a position displaced from the position indicated by the end point of the pen 14.

SUMMARY OF THE INVENTION

It is therefore an object of the present invention to provide an active matrix LCD in which warping of the substrates and damage of switching elements are prevented and parallax between the end point of the pen of the pen input device and the image formed by the liquid crystal is eliminated.

In accordance with the present invention, to achieve the above object, there is provided a liquid crystal display (LCD) with integrated tablet comprising an upper substrate on a viewing side on which electrodes are formed to drive liquid crystal, a lower substrate on an opposing side on which electrodes are formed at positions to drive liquid crystal interposed between the upper substrate and the lower substrate, a liquid crystal of phase-change guest-host (PCGH) mode interposed between the upper substrate and the lower substrate, light illuminating means arranged at a position in a lower portion of the LCD, and tablet means for detecting coordinates disposed at a position in an upper or lower portion of the display not to prevent transmission of light from the light illuminating means.

In accordance with the present invention, there are preferably disposed reflection plates between the upper and lower substrates or at a position in a lower portion of the display, the tablet means for detecting coordinates being disposed at a position in the upper or lower portion of the display not to prevent transmission of reflection light from the reflection plates.

Preferably, in accordance with the present invention, the tablet means for detecting coordinates is formed at a position on the upper or lower substrate of the display not to prevent transmission of light from the light illuminating means, the tablet means being separated from the liquid crystal.

In accordance with the present invention, the tablet means for detecting coordinates is formed at a position on the upper or lower substrate of the display not to prevent transmission of light from the light illuminating means, the tablet means being separated from the liquid crystal.

Moreover, the LCD in accordance with the present invention further includes reflection plates arranged on a surface of the lower substrate, the surface being brought into contact with the liquid crystal. The tablet means is formed at a position between the surface of the lower substrate and the liquid crystal driving electrodes not to prevent transmission of light from the light illuminating means.

The LCD in accordance with the present invention preferably includes reflection plates arranged between the upper and lower substrates, the tablet means being formed between the surface of the upper substrate and the liquid crystal driving electrodes. The tablet means allows transmission of light therethrough.

In accordance with the present invention, the LCD desirably includes reflection plates arranged in a lower portion of the display, the tablet means being formed between the surface of the upper substrate and the liquid crystal driving electrodes. The tablet means allows transmission of light therethrough.

Furthermore, in accordance with the present invention, there is provided an LCD with integrated tablet comprising an upper substrate on a viewing side on which electrodes are formed to drive liquid crystal, a lower substrate on an opposing side on which electrodes are formed at positions to drive liquid crystal interposed between the upper substrate and the lower substrate, the liquid crystal interposed between the upper substrate and the lower substrate, a plurality of pole braces for linking the upper substrate with the lower substrate with a period substantially equivalent to that of pixels of the display, light illuminating means arranged in a lower portion of the display, and tablet means for detecting coordinates disposed at a position in an upper or lower portion of the display not to prevent transmission of light from the light illuminating means.

In accordance with the present invention, there is provided an active matrix LCD comprising a plurality of pixel electrodes arranged in a matrix contour, a substrate on pixel electrode side including pixel driving elements disposed opposing the pixel electrodes, an opposing substrate including electrodes arranged opposing the pixel electrodes, and a liquid crystal layer interposed between the opposing substrate and the pixel electrodes. The substrate on the pixel electrode side includes a glass substrate. The opposing substrate includes a plastic film substrate having a thickness of 0.6 mm or less and is arranged on a viewing side of the display.

Preferably, the display in accordance with the present invention essentially comprises a transmission-type active matrix display of TN mode driven by TFTs.

In accordance with the present invention, the display is preferably a reflection-type display of PHGH mode driven by TFTs.

In accordance with the present invention, the display further includes pen input electrodes.

Preferably, the pixel electrodes of the display in accordance with the present invention include metallic reflection electrodes.

In a liquid crystal display with integrated tablet in accordance with the present invention, a liquid crystal of GH mode is utilized for the LC layer in a display in which when a pen, a finger, or the like is brought into contact with a surface of the display, a position of the surface associated with the contact point is detected on the tablet. Even when the gap thickness of liquid crystal varies due to pressure applied from an end point of the pen or the finger, the change in transmittivity is minimized when compared with that of the conventional TN liquid crystal. Consequently, the deterioration in the quality of displayed image is practically prevented.

Alternatively, a plurality of pole braces or supporting regions are arranged between the upper and lower substrates such that influence from pressure of the end point of the pen or the finger upon the gap thickness is sufficiently reduced. Consequently, the picture quality is not adversely influenced and hence is not deteriorated in practices.

As a result, the protective layer preventing the change in the gap thickness in the prior art can be dispensed with and hence it is possible to minimize thickness and weight of the display. Furthermore, since the substrates keeping liquid crystal therebetween are exposed, the tablet can be formed directly on the substrate. Namely, it is unnecessary to provide the tablet as an independent product.

Moreover, when the film substrate on the viewing side of the operator has a thickness of 0.6 mm or less, when a character or the like is inputted to the display by a pen of a pen input facility, the distance between the end point of the pen and the image displayed by liquid crystal is at most 0.6 mm and hence parallax is rarely recognized by the operator. The thickness of the film substrate is preferably set to 0.2 mm or less. Additionally, since a conventional glass substrate having a thickness of about 0.6 mm to about 1.1 mm is employed for the substrate on the pixel electrode side to constitute switching elements of the active matrix, the camber of the substrate on pixel electrode side is prevented in the manufacturing of switching elements and hence damages damage resulting due to camber is substantially eliminated.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the accompanying drawings, description will be given of embodiments in accordance with the present invention.

In the description, the present invention is applied to a 24 centimeter (cm) diagonal color LCD having a dot layout of 640 horizontal dots for red (R), green (G), and blue (B) and 480 vertical dots.

Embodiment 1

Figure 1:
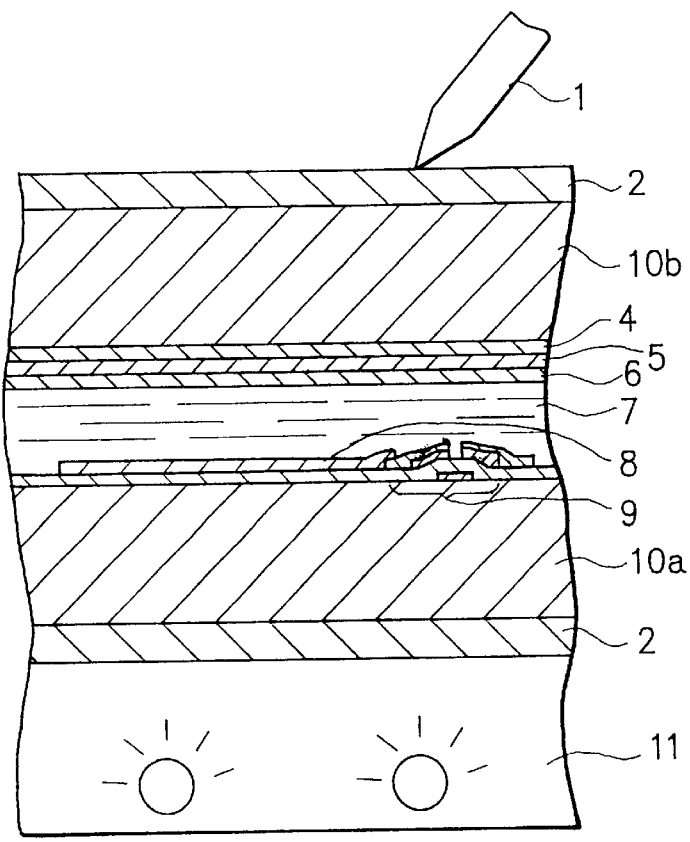
FIG. 1 is a cross-sectional view briefly showing the construction of an example of a conventional transmission-type active matrix LCD of TN mode driven by TFTs.
Figure 2:
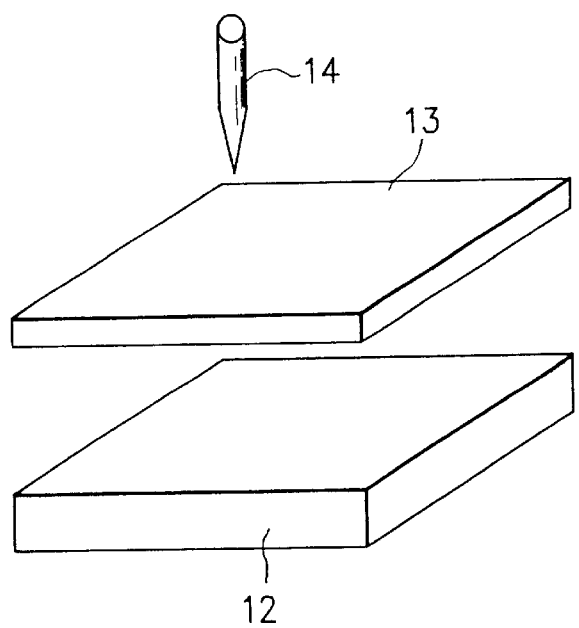
FIG. 2 is a perspective view showing structure of an embodiment of a LCD in accordance with a conventional technology.
Figure 3:
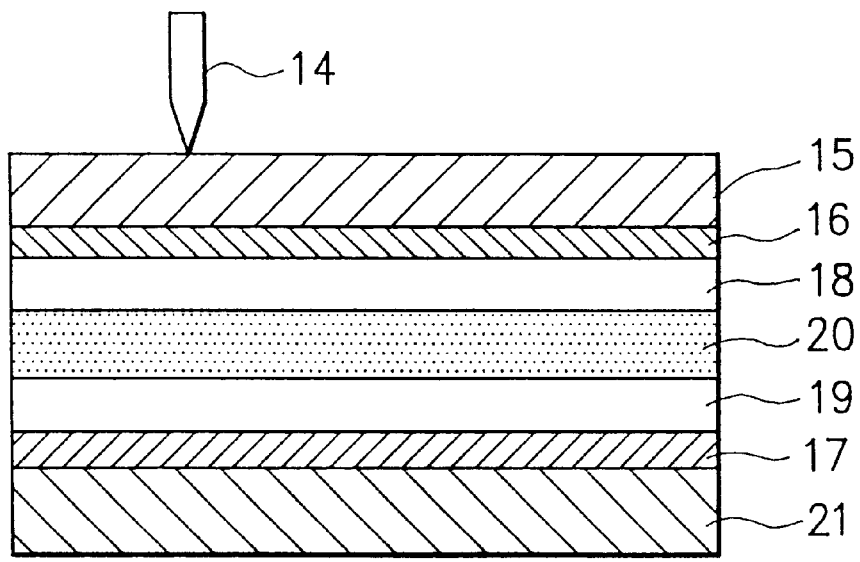
FIG. 3 is a cross-sectional view of the LCD shown in FIG. 2.
Figure 4:
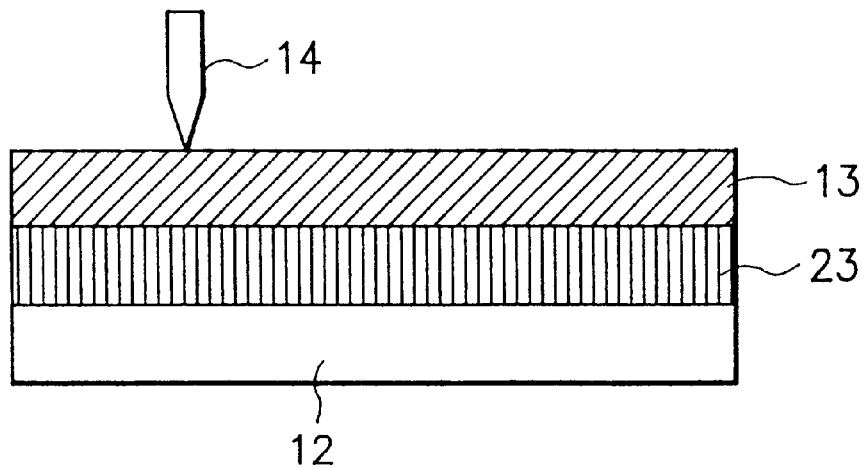
FIG. 4 is a cross-sectional view of an improved configuration of the LCD shown in FIG. 2.
Figure 5:
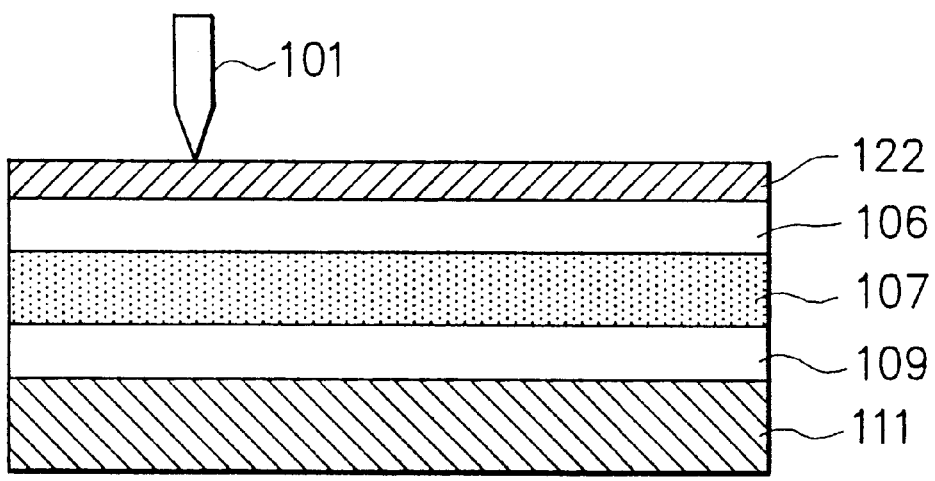
FIG. 5 is a cross-sectional view showing construction of a first embodiment in accordance with the present invention.

FIG. 5 shows in a cross-sectional view the configuration of an LCD in accordance with the present invention. The display of FIG. 5 includes a pen 101 to conduct an input operation, a tablet layer 122 including a glass substrate and indium-tin-oxide (ITO) electrodes formed thereon to detect a position on which the pen 101 is placed, an TFT substrate 109 including 480 scanning lines to apply a voltage to liquid crystal, 1920 signal lines, 921,600 thin-film field-effect transistors (TFTs), and pixel electrodes; a common electrode substrate 106 including a color filter in which ITO electrodes are formed to apply a voltage to liquid crystal, a GH-mode liquid crystal layer 107, and a back light layer 111 as a light source.

The display principle of the embodiment is almost the same as that of a transmission-type active matrix LCD generally known. On the other hand, when inputting data to the tablet section, the pen 101 is brought into contact with the tablet 122. In this situation, even when the tablet 122 and common electrode substrate 106 are depressed by pressure of the pen 101 and hence the gap thickness of the liquid crystal layer 107 is altered, there does not occur a practical problem of change in transmittivity since a GH-mode liquid crystal is employed for the liquid crystal layer.

In this connection, in the description of the embodiment, a transparent ITO film developing its function by use of electrostatic capacitance between the pen 101 and the tablet 122 is employed in the tablet section for detecting the coordinates of the point touched with the pen 101. However, the present invention is not restricted to this example. It is to be appreciated that similar advantage is obtainable when there is employed a method in which pressure is applied to electrodes to sense change in the values of resistance of electrodes due to the pressure, a tablet system of a type in which the coordinates are detected according to electromagnetic coupling between the pen 101 and tablet 122, or a method in which the tablet system 122 is arranged on the rear side of the back light layer 111.

Embodiment 2

Figure 6:
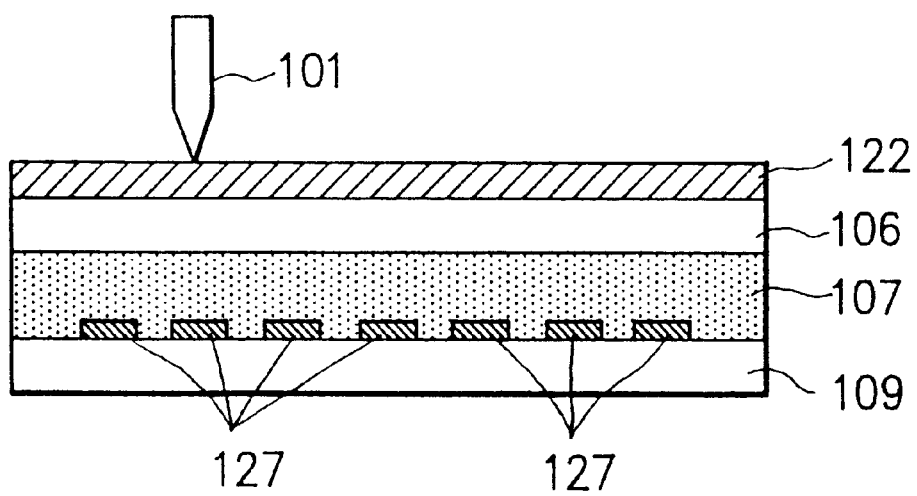
FIG. 6 is a cross-sectional view showing structure of a second embodiment in accordance with the present invention.

FIG. 6 is a cross-sectional view showing the construction of an LCD in accordance with the present invention. The display of FIG. 6 includes a pen 101 to input data in the display, a tablet system 122 including a glass substrate and ITO electrodes formed thereon to detect a position indicated by an end point of the pen 101, an TFT substrate 109 including 480 scanning lines to apply a voltage to liquid crystal, 1920 signal lines, 921,600 TFTs. and pixel electrodes; a common electrode substrate 106 including a color filter in which ITO electrodes are formed to apply a voltage to liquid crystal, a GH-mode liquid crystal layer 107, and reflection plates 127 formed with aluminum on the pixel electrodes.

The principle of image presentation of this embodiment is almost identical to that of a transmission-type active matrix LCD generally known. On the other hand, when inputting data to the tablet section, the pen 101 is brought into contact with the tablet 122. On the occasion, even when the tablet 122 and common electrode substrate 106 are pushed by pressure of the pen 101 and hence the gap thickness of the liquid crystal layer 107 is varied, there substantially does not occur the problem of change in transmittivity thanks to the GH-mode liquid crystal utilized for the liquid crystal layer.

Incidentally, in this embodiment, a transparent material achieving its function by electrostatic capacitance between the pen 101 and the tablet 122 is used in the tablet system for detecting the values of coordinates of the point touched with the pen 101. However, the present invention is not limited to this example. It is to be understood that similar advantage can be attained when there is employed a tablet system of a type in which the coordinates are decided according to electromagnetic coupling between the pen 101 and tablet 122 or a method in which the tablet system 122 is provided on the rear side of the LCD.

Furthermore, in the description of the embodiment, the reflective plates 127 are formed on a surface of the TFT substrate 109 on which TFTs are fabricated. However, the present invention is not restricted to the embodiment. Namely, similar advantageous effect can be obtained when the reflective plates 127 are formed on a surface opposite to that of the TFT substrate 109 on which TFTs are fabricated. In the case where a tablet system utilizing electromagnetic coupling is employed, the tablet system 122 need only be arranged such that the reflection plates 127 are placed between the tablet system 122 and the operator of the LCD.

Embodiment 3

Figure 7:
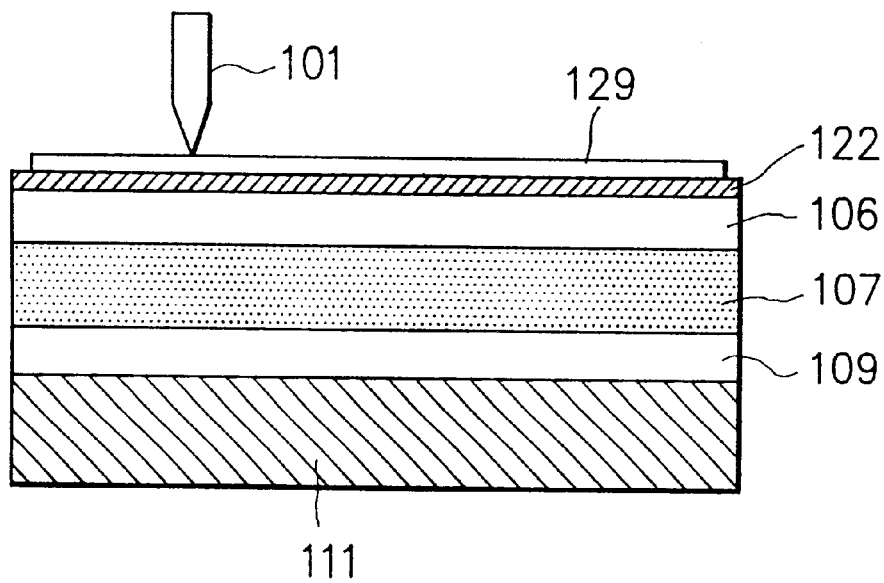
FIG. 7 is a cross-sectional view showing construction of a third embodiment in accordance with the present invention.

FIG. 7 shows in a cross-sectional view the configuration of an LCD in accordance with the present invention. The display of FIG. 7 includes a pen 101 to accomplish a data input operation, a tablet electrode layer 122 including a common electrode substrate and ITO electrodes formed thereon to detect a position indicated by an end point of the pen 101, a TFT substrate 109 including 480 scanning lines to apply a voltage to liquid crystal, 1920 signal lines, 921,600 TFTs, and pixel electrodes; a common electrode substrate 106 including a color filter in which ITO electrodes are formed to apply a voltage to liquid crystal, a liquid crystal layer 107, a back light layer III as a light source, and a protection film 129 for protecting the ITO regions against damage due to contact with the pen 101.

The principle of displaying images in this embodiment is substantially the same as that of a transmission-type active matrix LCD generally known. On the other hand, when inputting data to the tablet 122, the pen 101 is brought into contact with the tablet electrode layer 122. In this situation, even when the common electrode substrate 106 is depressed with the pen 101 by the operator and hence the gap thickness of the liquid crystal layer 107 is altered, there practically does not arise the problem of change in transmittivity because of utilization of the GH-mode liquid crystal for the liquid crystal layer.

In this connection, in the description of embodiment 3, a transparent ITO film carrying out its function by electrostatic capacitance between the pen 101 and the tablet 122 is employed in the tablet system for detecting the coordinates of the point touched with the pen 101. However, the present invention is not restricted to this example. Naturally, similar advantage is attainable when there is employed a method in which pressure is applied to electrodes to detect change in values of resistance of the electrodes or a method in which the coordinates are decided by directly detecting potential of the tablet electrode 122 by the pen 101.

Embodiment 4

Figure 8:
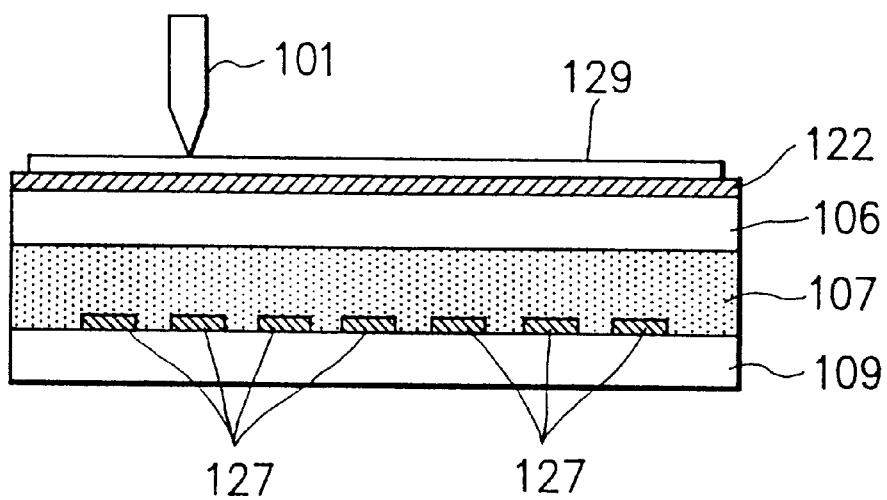
FIG. 8 is a cross-sectional view showing structure of a fourth embodiment in accordance with the present invention.

FIG. 8 is a cross-sectional view showing the configuration of an LCD in accordance with the present invention. The LCD of FIG. 8 includes a pen 101 to carry out a data input operation, a tablet electrode layer 122 including an opposing electrode substrate and ITO electrodes formed thereon to detect a position touched by an end point of the pen 101, a TFT substrate 109 including 480 scanning lines to apply a voltage to liquid crystal, 1920 signal lines, 921,600 TFTs, and pixel electrodes; a common electrode substrate 106 including a color filter in which ITO electrodes are formed to apply a voltage to liquid crystal, a GH-mode liquid crystal layer 107, reflection plates 127 formed with aluminum on the pixel electrodes, and a protection film 129 for protecting the ITO regions from being damaged by contact with the pen 101.

The principle of image display operation in this embodiment is almost the same as that of a transmission-type active matrix LCD generally known. On the other hand, when inputting data to the tablet section, the pen 101 is brought into contact with the tablet electrode layer 122. In this embodiment, even when the common electrode substrate 106 is pushed with the pen 101 by the operator and hence the gap thickness of the liquid crystal layer 107 is changed, there practice does not take place the problem of change in transmittivity because of adoption of the GH-mode liquid crystal for the liquid crystal layer.

Incidentally, in this embodiment, a transparent ITO layer performing its function by electrostatic capacitance between the pen 101 and the tablet 122 is utilized in the tablet system for detecting the coordinates of a position touched with the pen 101. However, the present invention is not limited to the example. It is to be appreciated that similar advantageous effect is obtainable when there is employed a method in which pressure is applied to electrodes to detect change in values of resistance thereof or a method in which the values of coordinates are determined by directly sensing potential of the tablet electrodes 122 by the pen 101.

Embodiment 5

Figure 9:
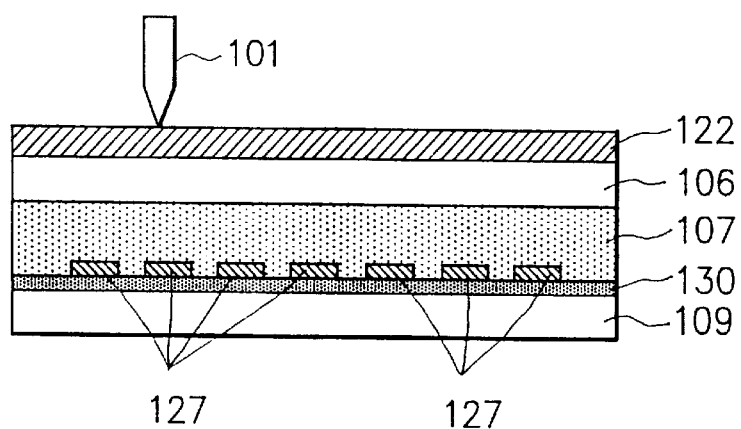
FIG. 9 is a cross-sectional view showing construction of a fifth embodiment in accordance with the present invention.

FIG. 9 shows in a cross-sectional view the configuration of an LCD in accordance with the present invention. The display of FIG. 9 includes a pen 101 to accomplish an input operation, a TFT substrate 109 including 480 scanning lines to apply a voltage to liquid crystal, 1920 signal lines, 921,600 TFTs, and pixel electrodes; a common electrode substrate 106 including a color filter in which ITO electrodes are formed to apply a voltage to liquid crystal, a layer of GH-mode liquid crystal 107, reflection plates 127 formed with aluminum on the pixel electrodes, and a pattern of tablet electrodes 130 formed with aluminum on the TFT substrate 109 to detect a position on which the pen 101 is placed.

This display principle of the embodiment is almost the same as that of a transmission-type active matrix LCD generally used. On the other hand, the operation to input data to the tablet system is achieved by magnetoelectric coupling between the tablet electrodes 130 and the pen 101 via the opposing electrode substrate 106 and liquid crystal layer 107. In this situation, even when the common electrode substrate 106 is pushed by pressure of the pen 101 held by the operator and hence the gap thickness of the liquid crystal layer 107 is altered, there practically does not occur any problem of alteration in transmittivity since a GH-mode liquid crystal is adopted as material of liquid crystal layer.

Embodiment 6

Figure 10:
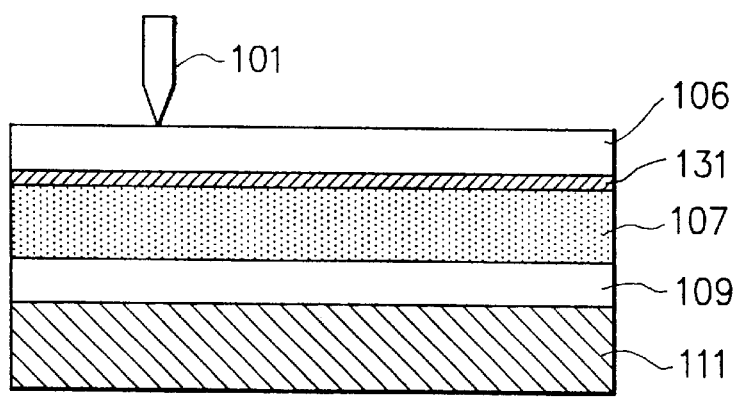
FIG. 10 is a cross-sectional view showing structure of a sixth embodiment in accordance with the present invention.

FIG. 10 is a cross-sectional view showing the construction of an LCD in accordance with the present invention. The configuration of FIG. 10 includes a pen 101 to conduct a data input operation, a TFT substrate 109 including 480 scanning lines to apply a voltage to liquid crystal, 1920 signal lines, 921,600 TFTs, and pixel electrodes; a common electrode substrate 106 including a color filter in which ITO electrodes are formed to apply a voltage to liquid crystal, a layer including GH-mode liquid crystal 107, a back light layer 111, and a tablet electrode layer 131 formed with ITO between the common electrodes of the common electrode substrate 106 and the substrate to detect a position indicated with the pen 101.

The principle of image presentation in this embodiment is almost identical to that of a transmission-type active matrix LCD generally known. On the other hand, when inputting data to the tablet 122, the input operation is carried out by electrostatic coupling between the tablet electrodes 131 and the pen 101 via the common electrode substrate 106. On the occasion, even when the common electrode substrate 106 is pushed with the pen 101 of the operator and hence the gap thickness of the liquid crystal layer 107 is varied. Practically there does not appear any problem of alteration in transmittivity thanks to the GH-mode liquid crystal utilized for the liquid crystal layer.

Incidentally, in the description of embodiment 6, a transmission-type active matrix LCD is adopted as the display. However, the present invention is not restricted to this embodiment. Namely, it is to be appreciated that similar advantageous effect can be obtained by using a reflection-type active matrix LCD.

Embodiment 7

Figure 11:
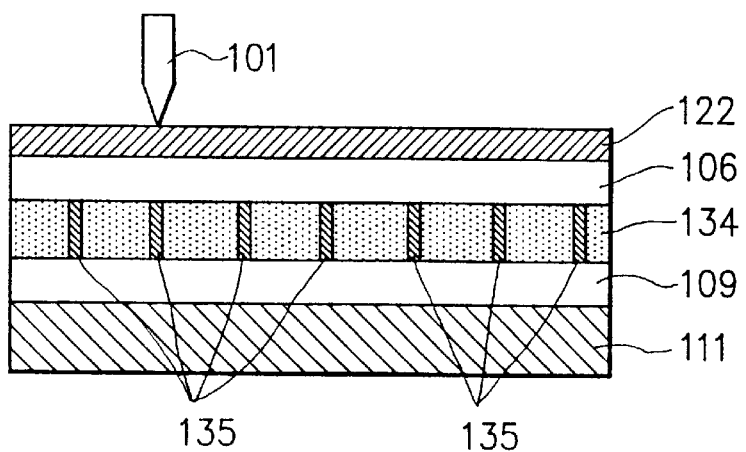
FIG. 11 is a cross-sectional view showing structure of a seventh embodiment in accordance with the present invention.

FIG. 11 shows in a cross-sectional view the configuration of an LCD in accordance with the present invention. The LCD of FIG. 10 includes a pen 101 to input data to the display, a tablet facility 122 including a glass substrate and ITO electrodes formed thereon to detect a position indicated with the pen 101, a TFT substrate 109 including 480 scanning lines to apply a voltage to liquid crystal, 1920 signal lines, 921,600 TFTs, and pixel electrodes; a common electrode substrate 106 including a color filter in which ITO electrodes are formed to apply a voltage to liquid crystal, a back light layer 111 as a light source, a layer including TN-mode liquid crystal 134, and supporting members or pole braces 135 disposed between the TFT substrate 109 and the common electrode substrate 106.

The braces 135 are formed as follows. On a TFT substrate prepared in a conventional method, a polyimid layer is formed on which a patterning process is conducted with a pattern of rectangles by photolithography. The resultant in-process material is then etched so as to thereby obtain the braces 135. The pole braces 135 are formed at positions other than those of pixel electrodes with a period substantially equivalent to the pitch of pixels.

The image presenting principle of this embodiment is almost the same as that of a transmission-type active matrix LCD generally known. On the other hand, when inputting data to the tablet facility, the tablet 122 is touched with the pen 101. In the operation, even when the tablet 122 and opposing electrode substrate 106 are depressed with pressure of the pen 101 or pressure of a finger of the operator, the gap thickness of the TN-mode liquid crystal layer 134 is rarely altered thanks to the pole braces 135 arranged with quite a short period. In consequence, there practically does not occur the problem of change in transmittivity thanks to the TN-mode liquid crystal of the liquid crystal layer. Even if the gap thickness is varied. since the period of braces 135 is substantially equivalent to the pitch of pixels, the change in gap thickness is at most about one pixel and hence the operator will not receive any uncomfortable feeling when viewing the presented image.

Incidentally, in the description of embodiment 7, a polyimid layer is used to form the braces 135 by photolithography so as to link the common electrode substrate 106 with the TFT substrate 109. However, the present invention is not limited to this embodiment. Namely, similar advantage can be naturally obtained by another means if there are employed material and structure in which the change in gap thickness of liquid crystal due to pressure such as that externally applied from the pen 101 or that applied via contact of a finger is within a range beyond which quality of displayed images is deteriorated.

Additionally, the braces 135 each have a rectangular contour in embodiment 7. However, any other shape may be used if the liquid crystal can be injected in its region with an appropriate orientation without any problem. In the description, the period of braces 135 is almost the same as the pitch of pixels. However, it is to be understood that similar advantageous effect is obtainable when the period of braces 135 is increased or decreased if the variation in gap thickness of liquid crystal is not conspicuous when the operator is viewing images displayed on the screen. Namely, the braces can be randomly arranged under the condition above.

Moreover, in the description of the embodiment, the braces 135 are arranged at positions other than those of the pixel electrodes. However, even when the braces 135 are formed over the pixel electrodes, the picture quality is not necessarily deteriorated. Namely, the similar advantage can be obtained also in this configuration.

Embodiment 8

Figure 12:
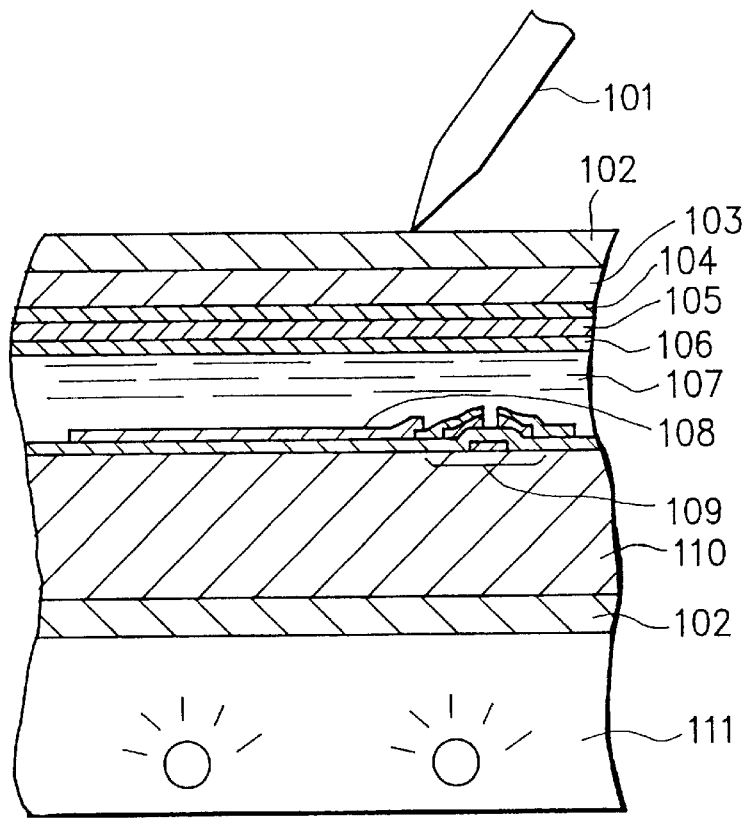
FIG. 12 is a cross-sectional view showing schematically of the configuration of an eighth embodiment of a transmission-type active matrix LCD of TN mode driven by TFTs in accordance with the present invention.

FIG. 12 is a cross-sectional view briefly showing structure of an eighth embodiment of the transmission-type active matrix LCD driven by TFTs in accordance with the present invention. The embodiment includes, as can be seen from FIG. 12, a substrate on pixel electrode side including a glass substrate having a thickness of about 0.6 mm to about 1.1 mm, a plurality of gate and drain bus lines fabricated in a matrix shape by a general TFT substrate manufacturing process, and TFTs 109 and pixel electrodes 108 connected thereto in association with the gate and drain bus lines. TFTs 109 as switching elements can be produced by growing a layer of amorphous silicon (a-Si), for example, by plasma chemical vapor deposition (CVD). The opposing substrate is a 0.1 mm thick film substrate 103 in which a common electrode 106 is formed with ITO. The film substrate 103 is fabricated with polyether sulfone, polyethylene telephthalate, etc. The substrate on the pixel electrode side and opposing substrate are fixed onto each other as follows. Polyimid or the like is applied to the substrates to form an orientation film thereon. The film is then subjected to a rubbing process for orientation. Spacers are arranged on either one of the substrates and a sealing material is applied onto the remaining substrate in a region outside the display area thereof. The substrates thus prepared are then attached onto each other. A space between these substrates is filled with liquid crystal to form a liquid crystal layer 107, thereby configuring a liquid crystal panel. The panel is inserted between two polarizer plates 102 and then a back light element 111 is arranged on the side of the substrate on the pixel electrode side so as to construct a liquid crystal display. For a color panel, there is further arranged a color filter 105. In the LCD, the operator views displayed images from the opposing substrate side. Furthermore, the LCD has a pen input function.

In the LCD data is inputted via the pen 101 and, the layer of pen input electrodes 104 functioning according to electrostatic coupling or electromagnetic induction is provided in the liquid crystal panel. Advantageously, there is not required, in addition to the liquid crystal panel. any other panel to be disposed on the viewing side. In this regard, even in a liquid crystal panel using a resistive film, it is only necessary to employ a film substrate 103.

As above, by reducing thickness of the opposing substrate on the viewing side as much as possible, parallax between a displayed image and the end point of the pen can be almost removed. Moreover, when the substrate on the pixel electrode side on which TFTs 109 are fabricated as switching elements is formed on a side opposite to the viewing side and there is employed a glass substrate 110 as in the conventional LCD structure, it is possible to prevent the camber of the substrate as well as damage to of the switching elements.

Embodiment 9

Figure 13:
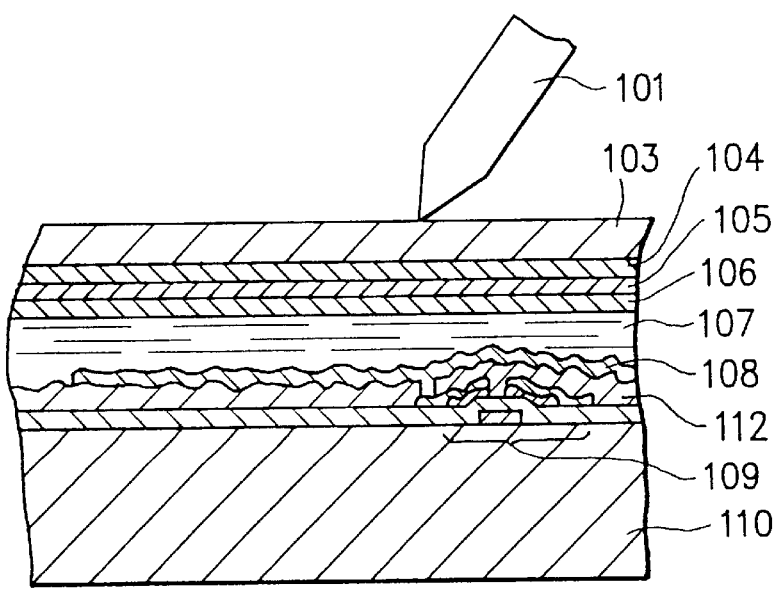
FIG. 13 is a cross-sectional view briefly showing the configuration of a ninth embodiment of a reflection-type active matrix LCD of PHGH mode driven by TFTs in accordance with the present invention.

FIG. 13 shows in a cross-sectional schematic view an outline of the construction of a ninth embodiment of a reflection-type active matrix LCD of PCGH mode driven by TFTs in accordance with the present invention. In the embodiment of FIG. 13, an insulating material such as polyimid is applied onto a TFT array 109 to form an insulation layer 112 so as to fabricate depressions and projections in a surface of the insulation layer 112 by an ordinary photoresist process. The pixel electrodes 108 serve also as reflection plates and hence are formed with a metal such as aluminum to be connected to the TFTs 109 via contact holes. Since a mixture including guest-host (GH) liquid crystal and dichroic dye is employed for a liquid crystal layer 107, it is unnecessary to dispose a polarizer plate on each of both side surfaces of the panel. -t Furthermore, the back light layer is missing because the LCD is of the reflection type. The other features of embodiment 9 are substantially the same as those of embodiment 8.

As described above, since the reflective LCD includes the pixel electrodes 108 functioning also as reflection plates in the liquid crystal panel, parallax is missing between the displayed image and its shadow on the reflection plate on the rear side. This prevents the troublesome phenomenon in which letters and characters are presented over the displayed image. Moreover, like in embodiment 8, parallax between a displayed image and the end point of the pen can be practically removed and hence the camber of the substrate on the pixel electrode side as well as damage to the switching elements can be prevented.

In the description of embodiments 8 and 9, TFTs are adopted as switching elements. However, similar advantage can be obtained by an active matrix configuration utilizing two-terminal elements such as MIMs and TFDs.

In accordance with the present invention, the protection plate conventionally inserted between the LCD and the tablet to retain the gap thickness of liquid crystal is removed as described above, and hence there can be achieved a weight reduction of 20%. Thickness thereof is also reduced to half that of the conventional LCD. Additionally, since a thick protection plate is missing between the end point of the pen and the display, there can be implemented a display free from the problem of parallax.

Furthermore, in accordance with the present invention, a glass substrate is used on the side of the pixel-electrode substrate and a plastic substrate having a thickness of 0.6 mm or less is employed for the opposing electrode substrate. Moreover, the opposing substrate is provided on the viewing side. Consequently, parallax between the displayed image and the end point of the pen of the pen input facility is substantially removed. In addition, there is attained an advantage that the camber of the substrate on the pixel electrode side and damage to of the switching elements can be prevented.

To produce a display with integrated tablet, the present invention has been applied to a 24 cm diagonal display of a personal computer, the display having a dot configuration of 480 vertical dots and 640 horizontal dots for red (R), green (G), and blue (B). Using a pen input facility having a resolution of about 200 $\mu$m for any image presented on the display, it is possible to minimize parallax between the end point of the pen and the display section. Moreover, the weight and thickness of the LCD can also be reduced.

While the present invention has been described with reference to the particular illustrative embodiments, it is not to be restricted to those embodiments but only as set forth in the appended claims. It is to be appreciated that those skilled in the art can change or modify the embodiments without departing from the scope and spirit of the present invention.

What is claimed is:

1. A liquid crystal display (LCD) with integrated tablet, comprising:

an upper substrate on a viewing side on which electrodes are formed to drive liquid crystal;

a lower substrate on an opposing side on which electrodes are formed at positions to drive liquid crystal interposed between the upper substrate and the lower substrate;

a liquid crystal of phase-change guest-host (PCGH) mode interposed between the upper substrate and the lower substrate;

light illuminating means arranged at a position in a region of the lower substrate of the LCD;

tablet means for detecting coordinates disposed at a position in an upper or lower portion of the display; and further including a plurality of reflection plates arranged in the region of the lower substrate of the display, the tablet means being formed between the surface of the upper substrate and the upper substrate liquid crystal driving electrodes, the tablet means allowing transmission of light therethrough.

2. A liquid crystal display as claimed in claim 1, wherein said reflection plates comprise metal plates.

3. A liquid crystal display as claimed in claim 2, wherein said metal plates comprise aluminum.

* * * * *

UNITED STATES PATENT AND TRADEMARK OFFICE
CERTIFICATE OF CORRECTION

PATENT NO.    : 6,473,140 B1
DATED         : October 29, 2002
INVENTOR(S)   : Mizobata et al.

It is certified that error appears in the above-identified patent and that said Letters Patent is hereby corrected as shown below:

Column 12,
Line 44, "the" should be -- a --.

Signed and Sealed this

Seventeenth Day of August, 2004

JON W. DUDAS
*Acting Director of the United States Patent and Trademark Office*